May 23, 1950 S. SENSIPER 2,508,426

ULTRA HIGH FREQUENCY APPARATUS

Filed March 22, 1946

INVENTOR
SAMUEL SENSIPER
BY Paul B. Hunter
ATTORNEY

Patented May 23, 1950

2,508,426

UNITED STATES PATENT OFFICE 2,508,426

ULTRA HIGH FREQUENCY APPARATUS

Samuel Sensiper, Garden City, N. Y., assignor to The Sperry Corporation, a corporation of Delaware Application March 22, 1946, Serial No. 656,202

13 Claims. (Cl. 178—44)

The present invention relates to devices operating at ultra-high frequencies and super-high frequencies and especially to attenuating devices adapted for use in concentric transmission line systems.

It is well known that a hollow-pipe wave guide, while an efficient conductor of electromagnetic energy whose wavelength is less than a critical value known as "cut-off" wavelength, determined by the internal transverse dimensions of the guide, is an excellent attenuator of electromagnetic energy provided the wavelength of the energy is greater than cut-off. As an example of the relative values of the attenuation above and below cut-off wavelength, an air-filled hollow conductive pipe of three inches inside diameter will conduct electromagnetic energy having a wavelength shorter than five inches with an attenuation constant smaller than one-tenth decibel per foot of length of the wave guide. This same guide, on the other hand, attenuates electromagnetic energy of wavelength appreciably greater than five inches by an attenuation constant greater than 120 decibels per foot of length of the wave guide.

It is this property of high attenuation per unit length of wave guide dimensioned to a frequency below cut-off that makes it useful as an ultra-high-frequency attenuator. While it would be possible to construct various lengths of such wave guide which could be inserted in a transmission line system and thus give the desired attenuation, it is more desirable from a practical standpoint to design the attenuator so that its total attenuation may be varied as desired. Another desirable feature is that the attenuation vary linearly with any displacement of the control mechanism. Several constructions of such variable attenuators have been suggested and tried. According to one such construction, electromagnetic energy is introduced into one end of a length of wave guide whose transverse dimensions make it below cut-off at the operating frequency and such energy is picked up by a loop or other form of pickup device which is movable inside the device. The attenuation varies with the distance between the source or input coupling of the electromagnetic energy and the pickup device.

In known attenuators of this type, the region in which the attenuation varies linearly with distance between input and pickup has been limited. The cause of this restricted range has been that prior energy sources have tended to excite the wave guide in several different modes of propagation, most of which attenuate quite rapidly with distance from the source. In order for the pick-up device to respond linearly with respect to its displacement, it is necessary to operate it beyond the range in which more than one mode can contribute energy. Thus, prior devices were linear only in that portion of the wave guide beyond which more than one mode existed in any appreciable degree.

Since it is only the linear range of the attenuator which is useful, any attenuation which exists at the low end of the attenuator's useful range is considered as a loss, usually termed an "insertion loss". In many applications in which such a variable attenuator is used in an ultra-high-frequency system, the source of the ultra-high-frequency energy may be limited in power output. For this reason, it is highly desirable that such losses be kept to a very minimum. Such insertion loss is the ratio (expressed in decibels) of the power delivered before the insertion of the attenuator into the system to the power delivered after the attenuator's insertion with the attenuator adjusted to minimum attenuation in its useful range. In prior variable attenuators, this insertion loss has had a value in the neighborhood of 45 decibels. In one form of attenuator made in accordance with the present invention, this value has been reduced to approximately 25 decibels.

A principal object of the present invention is to provide improved apparatus for exciting a wave guide in which excitation is minimized in all but a single predetermined mode.

It is a further object of the present invention to provide apparatus for exciting a wave guide operated at a frequency below cut-off in which the insertion loss is reduced to a minimum value.

For general utility, it is desirable that measuring or adjusting instruments such as attenuators be so designed that they will operate satisfactorily over a wide range of frequencies, without introducing undesirable standing waves. An attenuator constructed in accordance with the present invention has a range of satisfactory operating frequencies which is approximately 20% greater than prior devices of the same class.

Thus, it is another object of the present invention to provide a wave guide attenuator having an extended range of satisfactory operating frequencies or so-called improved band-width characteristics.

In accordance with the present invention there is provided a section of wave guide dimensioned below cut-off which is coupled in a novel fashion to a section of coaxial line by which it is excited. The novel coupling consists of a rectangular slot in a flat plate which terminates one end of the wave guide. This end of the wave guide is inserted, in T fashion, into the coaxial line in such a manner that the distance between the center conductor of the line and the flat end plate is quite small. This reduction in distance between the end plate and the center conductor of the coaxial line considerably reduces insertion loss. The inner wall of the outer conductor of the line is tapered so as to lead up to the flat plate without introducing any sharp discontinuity into the wall of the coaxial line. The tapering thus prevents undesirable wave reflections that would occur if the end of the wave guide alone protruded into the coaxial line.

The combination of wave guide insertion and side wall tapers further results in an extended frequency range in which the standing wave ratio is small. Such a frequency range is termed the "bandwidth" of the instrument. A movable coupling loop is provided inside the wave guide. This allows the distance to be varied between the end of the wave guide which is excited and the coupling loop, which variation in distance changes the amount of attenuation.

The linearity of the attenuator is dependent upon but one mode being excited in the wave guide. The rectangular slot in the flat end plate gives just such desired results.

A further improvement in the linearity of the attenuator may be achieved by a modification of the movable coupling loop. This modification consists in the addition of "wings" or shorting members to the sides of the movable coupling loop. Such members short out the electric field of undesirable modes which may exist in the wave guide while having no effect on the desired mode excited by the rectangular slot.

The invention in another of its aspects relates to novel features of the instrumentalities described herein for achieving the principal objects of the invention and to novel principles employed in those instrumentalities, whether or not these features and principles are used for the said principal object or in the said field.

A further object of the invention is to provide improved apparatus and instrumentalities embodying novel features and principles, adapted for use in realizing the above objects and also adapted for use in other fields.

Figures 1, 2, 3, 4, 5:
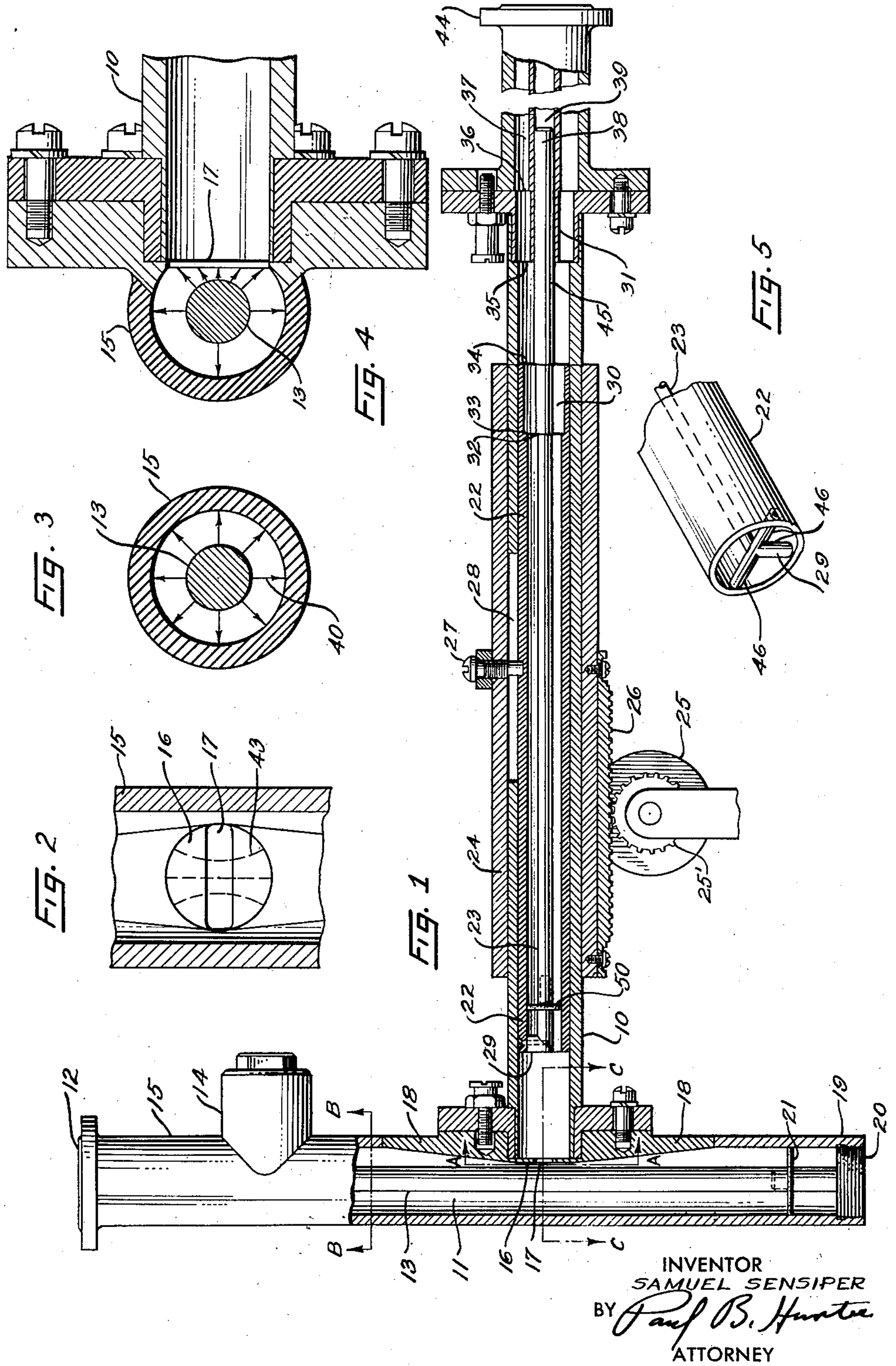
Fig. 1 is a plan view, partly in section of one embodiment of the present invention.
Fig. 2 is a fragmentary cross-sectional view taken along line A—A in Fig. 1 which shows the rectangular slot.
Fig. 3 is a cross-section of an ordinary coaxial line with conventional electric field configuration, as at line B—B of Fig. 1.
Fig. 4 is a fragmentary cross-section taken along line C—C of Fig. 1 showing the electric field configuration at this point.
Fig. 5 is a perspective view of a modified form of coupling loop used in the embodiment shown in Fig. 1.

In Fig. 1 is shown a plan view of an embodiment of the present invention. A section of wave guide 10 dimensioned below cut-off in the operating frequency range is inserted in T fashion into coaxial line 11 through which ultra-high-frequency energy is introduced at end 12 thereof. This coaxial line 11 is of the conventional type having center conductor 13 supported by any well known broad-band support such as the conventional T stub support 14 within an outer conductor 15. If it is desired, a power monitor may be connected to the opposite end 19 of the coaxial line 11 by means of threaded connection 20. This permits a measure of the absolute power level of the ultra-high-frequency energy before it is attenuated. An input-matching resistor disc 21 is provided near the end 19 of the coaxial line 11. The purpose of this disc 21 is to match the input impedance of the attenuator looking down the coaxial line 11 at the end 12 with the microwave transmission system into which the attenuator is inserted.

The end of wave guide 10 which protrudes through the outer conductor 15 of the coaxial line 11 is terminated in a flat plate 16 which contains a rectangular slot 17 extending perpendicularly to inner conductor 13. This flat plate 16 is positioned close to center conductor 13. Wall tapers 18 which lead up to flat plate 16 are provided on the inside wall of outer conductor 15 so as to prevent a sharp discontinuity which would cause reflections in the coaxial line resulting in an undesirable high standing wave ratio which would increase the insertion loss.

Mounted inside wave guide 10 is a movable pickup loop 29. One end of this pickup loop 29 is fastened to the inner wall of a tube 22 which slides telescopically inside the wave guide 10. The remaining end of pickup loop 29 extends axially down tube 22 to form a center conductor 23 of a coaxial line formed by tube 22 and center conductor 23. Approximately one-quarter of a wavelength down the center conductor 23 away from pickup loop 29 a matching resistor disc 50 is provided to match the output impedance of the attenuator to the systems with which it is to be connected. An outer tube 24, which surrounds wave guide 10, can be moved in translation by means of knob 25 fixed to a pinion 25' which interacts with rack 26 fastened to tube 24. This translation of tube 24 is transferred to tube 22 by means of screw 27 which passes through a slit 28 in wave guide 10 and engages tube 22. Thus, by rotation of knob 25, outer tube 24, tube 22, loop 29 and center conductor 23 move in translation as a unit. Such movement varies the distance between exciting slot 17 and coupling loop 29. As can readily be seen from Fig. 1, the length of wave guide 10 that is used to transfer energy is just the distance between slot 17 and loop 29, as the system becomes a normal coaxial transmission line beyond loop 29. It is this length of wave guide 10 which provides the attenuation.

Since the coaxial line that is formed by tube 22 and center conductor 23 is smaller in cross-section than the standard coaxial line 11, it is necessary to provide transition units in order to bring the dimensions of the inner and outer conductors up to the standard size. It is also necessary to provide a telescoping joint for the center conductor 23 to allow for its translatory motion. Step-types of transition units are shown at 30 and 31. As is seen at 30, a short section of coaxial line is provided with increased dimensions by a step or increase in cross-section 32 in the center conductor 23 and a similar step 33 in the outer conductor or tube 22. In making such steps it is necessary that the ratio of the inside diameter of the outer conductor to the diameter of the inner conductor be kept constant so that the characteristic impedance of the line, which is a function of this ratio, does not change. Furthermore, these changes must be made in small steps so as not to set up any local field effects at the step which would cause reflections to be set up in the coaxial line. To remove any capacitance effects that may be introduced by the steps, it is customary to make the length of the transition units or steps approximately one-quarter of a wavelength of the energy which the device is designed to attenuate. In this way the capacitance effects introduced by one step are cancelled by the capacitance effects introduced by the second step a quarter of a wavelength further along the line. Steps similar to 32 are shown at 34, 35 and 36 with the distance between successive steps of each pair being approximately one-quarter of a wavelength. The last of these steps 36 provides a transition to coaxial line 37 which is of standard size and allows a standard output connector 44 to be provided at the end of the coaxial line 37.

If it so happens that the impedance of the coaxial line having the smaller dimensions differs from the impedance of the standard output coaxial line, such transition units not only serve to provide steps for increasing the coaxial line dimensions but also allow for a gradual impedance transformation. In such a case the characteristic impedance of any transition unit is so designed so as to be equal to the root-mean-square of the characteristic impedance values of the two lines which it connects.

An alternative type of transition unit is the familiar coaxial tapered section. In this type of transition unit both the inner and outer conductors are enlarged in a tapered section, care being taken as in the step type of transition unit, that the ratio of the outer conductor diameter to inner conductor diameter be kept constant so that the impedance of the line does not change.

The center conductor 38 of coaxial line 37 has a bore 39 at one end. This bore 39 receives the enlarged end section 45 of the center conductor 23 and enables movement of the same in translation.

In operation, ultra-high-frequency energy is introduced at end 12 of coaxial line 11. The electric field that is thus set up between the inner conductor 13 and the outer conductor 15 excites the rectangular slot 17 which in turn excites the wave guide 10. Energy is transferred by way of wave guide 10 to the pickup loop 29 which couples the energy to the coaxial line formed by the center conductor 23 and outer conductor 22. This energy is transmitted through coaxial line 37 to the standard coaxial fitting 44. Since wave guide 10 is dimensioned below cut-off for the ultra-high-frequency energy that is introduced into coaxial line 11, it attenuates this energy as it is transferred to pickup loop 29. The amount of attenuation is determined by the length of the transfer path between resonant slot 17 and pickup loop 29. Therefore, as the knob 25 is rotated and the pickup loop 29 is moved away from rectangular slot 17, the length of the wave guide 10 that is used is increased, thereby increasing the total attenuation.

The advantage of bringing the end of wave guide 10 close to the center conductor 13 is readily seen by reference to Figs. 3 and 4. In Fig. 3 we see the cross-section of a conventional coaxial line with the arrows 40 representing the electric field configuration. As is well known, if the inner and outer conductors 13 and 15 are both circular in cross-section and are concentrically placed, the electric field will be radial and uniform around the axis of the coaxial line at any given distance away from the center conductor.

If we now refer to Fig. 4 we see that the situation is changed considerably. Instead of a uniform field, there is a concentration of the electric field in the region of slot 17, due to the proximity of plate 16 which contains slot 17 to the center conductor 12. It is this concentration of the electric field in the region of the rectangular slot 17 which excites the wave guide 10 in such an efficient manner thus reducing the insertion loss from the usual figure of 45 decibels to approximately 25 decibels. Care must be taken, however, that reflections are not set up in coaxial line 11 by the insertion of the end of wave guide 10 through the outer conductor 15. Such reflections would result in a high standing wave ratio with a resulting increase in insertion loss. To prevent such reflections, the wall tapers 18 are built into the inner wall of the outer conductor 15. These wall tapers 18 lead the inner wall up to the flat plate 16 in a gradual slope without introducing any sharp discontinuity in the conducting surface. In one embodiment of this invention the length of these tapers 18 may be approximately one-half of a wavelength at the wavelength of the approximate center of the band for which the attenuator is designed. The combination of tapers 18 and the reduction in distance between center conductor 13 and exciting slot 17 not only lowers the insertion loss, as mentioned, but aids considerably in improving the bandwidth of the device. As mentioned previously, bandwidth is the frequency range over which the instrument will operate and still maintain a small standing wave ratio.

The advantage in using slot excitation of the cut-off wave guide is in the reduction of multiple mode excitation; that is, the energy which passes through the wave guide 10 is predominantly of a single mode. Reference to Fig. 2 which is a cross-section taken along line A—A of Fig. 1 shows rectangular slot 17. By virtue of the rectangular shape of this slot 17, a mode of the $TE_{11}$ type is predominantly excited in the wave guide 10 having an electric field configuration 43 as is shown by dotted lines in Fig. 2. This type of slot minimizes excitation of modes other than the $TE_{11}$ mode. As pointed out previously the advantage of unimodal excitation is that the energy which is transferred down the wave guide 10 is attenuated substantially linearly with increase in the distance between the rectangular slot 17 and the pickup loop 29. With multiple-mode excitation this is not the case, since each mode that is excited has its individual attenuating characteristics with respect to distance along the wave guide, and the pickup device 29 responds at any given point along the wave guide to the sum of the electric fields due to each of the modes excited. From the foregoing, it is apparent that it is only in the region beyond which more than one mode exists that the attenuator varies linearly with displacement of the pickup loop 29. Thus, slot excitation of the present type aids in extending the region of linearity of the attenuator.

It should be noted that any improvement or extension in linearity by minimizing extraneous modes allows the minimum usable value of attenuation to be lowered. Thus, the insertion loss of the attenuator is decreased by an increase in linearity.

A further improvement in linearity of the attenuator and reduction of insertion loss may be obtained by a modification of the pickup loop 29. It is readily understood that if the pickup loop 29 could be so modified that it would respond to the desired mode existing in the wave guide 10 and at the same time minimize its response to undesirable modes that might exist, the overall performance of the attenuator would thus be improved. Such a modification of the coupling loop 29 is shown in Fig. 5. In this modification, the coupling loop 29 is provided with arms or "wings" 46 which extend radially from the center conductor 23 in the plane of coupling loop 29 and at right angles to it. These "wings" 46 may or may not touch the wall of the outer conductor 22, as desired. Such wings 46 serve to short out or "kill" any electric field configuration which has a component along their axis. Since the electric field configuration of the desired mode which is excited by the rectangular slot 17, shown by dotted lines in Fig. 2, is normal to the axis of such wings 46, it remains unaffected by their presence. Hence the wings 46 cause loop 29 to respond only to a single mode of excitation of wave guide 10, even if other modes should be excited therein, and improve correspondingly the performance of the attenuator with respect to linearity, insertion loss, and bandwidth.

Although the present invention is shown embodied in an ultra-high-frequency attenuator, it should be understood that such a coupling device will work equally well in any instrument or transmission system in which it it desired to couple a coaxial line to a wave guide in which it is desired that but one predominating mode be excited or be picked up.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for variable attenuation of electromagnetic energy comprising a section of coaxial line through which said energy is adapted to be conducted, a wave guide with cross-sectional dimensions too small for efficient transmission of said energy in the band of operating wavelength, said wave guide communicating with said coaxial line and having an end protruding through the outer conductor of said coaxial line but spaced from the inner conductor of said coaxial line, means for coupling said coaxial line to said wave guide, said means comprising a flat plate mounted across said inwardly protruding end of said wave guide, said flat plate having a rectangular slot therein, extending perpendicularly to said coaxial line, means for preventing energy reflections in said coaxial line due to the protrusion of said end of said wave guide into the outer conductor of said coaxial line, said means comprising tapered conductive members leading from the inner wall of the outer conductor of said coaxial line to the said flat plate and removing discontinuities in said coaxial line, means for extracting said energy having but a preferred plane of electric field orientation in said wave guide, said means comprising a coupling member oriented so as to couple with said energy having said field orientation and a plurality of shorting members oriented at right angles to said coupling member and mounted in a plane normal to the direction of energy transfer in said wave guide, said shorting members serving to short-out any electric field having a component normal to the axis of said coupling member, and means for varying the longitudinal position of said energy-extracting means, whereby the length of said hollow wave guide between said rectangular slot and said energy extracting means is varied, causing variation in the attenuation of said energy.

2. Apparatus for variable attenuation of electromagnetic energy, comprising a section of coaxial line through which said energy is conducted, a wave guide dimensioned below cut-off in the band of operating wavelengths, said wave guide communicating with said coaxial line and having an end protruding through the outer conductor of said coaxial line but spaced from the inner conductor of said coaxial line, means for coupling said coaxial line to said wave guide, said means comprising a thin conductive member mounted across said inwardly protruding end of said wave guide, said member having an opening therein, means for preventing energy reflections in said coaxial line due to the protrusion of the end of said wave guide into the outer conductor of said coaxial line, means for extracting said energy having but a preferred plane of electric field orientation in said wave guide, said means comprising a coupling member oriented so as to couple with said energy having said field orientation and a plurality of shorting members oriented at right angles to said coupling member and mounted in a plane normal to the direction of energy transfer in said wave guide, said shorting members serving to short out any electric field having a component normal to the axis of said coupling member, and means for varying the position of said energy extracting means, causing variation in the attenuation of said energy.

3. Apparatus for variable attenuation of electromagnetic energy comprising a section of coaxial line through which said energy is adapted to be conducted, a wave guide of cross-sectional dimensions too small for efficient transmission of said energy in the band of operating wavelengths, said wave guide communicating with said coaxial line and having an end protruding through the outer conductor of said coaxial line but spaced from the inner conductor of said coaxial line, means for coupling said coaxial line to said wave guide, said means comprising a flat plate mounted across said inwardly protruding end of said wave guide, said flat plate having a rectangular slot therein extending perpendicularly to said coaxial line, means for preventing energy reflections in said coaxial line due to the protrusion of the end of said wave guide into the outer conductor of said coaxial line, said means comprising tapered conductive members leading from the inner wall of the outer conductor of said coaxial line to the said flat plate and removing discontinuities in said coaxial line, means for extracting said energy from within said wave guide, and means for varying the longitudinal position of said energy-extracting means, whereby the length of said wave guide between said rectangular slot and said energy-extracting means is varied, causing variation in the attenuation of said energy.

4. Apparatus for variable attenuation of electromagnetic energy comprising a section of coaxial line through which said energy is adapted to be conducted, a wave guide of cross-sectional dimensions too small for efficient transmission of said energy in the band of operating wavelengths, said hollow wave guide communicating with said coaxial line and having an end protruding through the outer conductor of said coaxial line but spaced from the inner conductor of said coaxial line, means for coupling said coaxial line to said wave guide, said means comprising a flat plate mounted across said inwardly protruding end of said wave guide, said flat plate having a slot therein, means for preventing energy reflections in said coaxial line due to the protrusion of the end of said wave guide into the outer conductor of said coaxial line, said means comprising tapered conductive members leading from the inner wall of the outer conductor of said coaxial line to the said flat plate and removing discontinuities in said coaxial line, means for extracting said energy from within said wave guide, and means for varying the longitudinal position of said energy-extracting means, whereby the length of said wave guide between said slot and said energy-extracting means is varied, causing variation in the attenuation of said energy.

5. Apparatus for variable attenuation of electromagnetic energy comprising a section of coaxial line through which said energy is adapted to be conducted, a wave guide dimensioned below cut-off in the range of operating wavelengths, said wave guide communicating with said coaxial line and having an end protruding through the outer conductor of said coaxial line but spaced from the inner conductor of said coaxial line, means for coupling said coaxial line to said wave guide, said means comprising a flat plate mounted across said inwardly protruding end of said wave guide, said flat plate having an opening therein, means for preventing energy reflections in said coaxial line due to the protrusion of the end of said wave guide into the outer conductor of said coaxial line, said means comprising tapered conductive members leading from the inner wall of the outer conductor of said coaxial line to the said flat plate and removing discontinuities in said coaxial line, means for extracting said energy from within said wave guide, and means for varying the longitudinal position of said energy-extracting means, whereby the length of said wave guide between said opening and said energy-extracting means is varied, causing variation in the attenuation of said energy.

6. Apparatus for variable attenuation of electromagnetic energy comprising a section of coaxial line through which said energy is adapted to be conducted, a wave guide dimensioned below cut-off in the range of operating wavelengths thereof, said wave guide communicating with said coaxial line and having an end protruding through the outer conductor of said coaxial line but spaced from the inner conductor of said coaxial line, means for coupling said coaxial line to said wave guide, said means comprising a thin conductive member mounted across the inwardly protruding end of said wave guide, said conductive member having an opening therein, means for preventing energy reflections in said coaxial line due to the protrusion of the end of said wave guide into the outer conductor of said coaxial line, said means comprising tapered conductive members leading from the inner wall of the outer conductor of said coaxial line to the said thin member and removing discontinuities in said coaxial line, means for extracting said energy from within said wave guide, and means for varying the longitudinal position of said energy-extracting means, whereby the length of said wave guide between said opening and said energy-extracting means is varied, causing variation in the attenuation of said energy.

7. Apparatus for variable attenuation of electromagnetic energy comprising a section of coaxial line through which said energy is adapted to be conducted, a wave guide of cross-sectional dimensions too small for efficient transmission of said energy in the range of operating wavelengths thereof, said wave guide communicating with said coaxial line and having an end protruding through the outer conductor of said coaxial line but spaced from the inner conductor of said coaxial line, means for coupling said coaxial line to said wave guide, said means comprising a thin conductive member mounted across the inwardly protruding end of said wave guide, said thin conductive member having an opening therein, means in said ccoaxial line for preventing energy reflections due to the protrusion of the end of said wave guide into the outer conductor of said coaxial line, said means comprising a tapered conductive structure extending from the inner wall of the outer conductor of said coaxial line to the periphery of said thin member, thereby eliminating discontinuities in the coaxial line, means for extracting said energy from within said wave guide, and means for varying the longitudinal position of said energy-extracting means, whereby the length of said wave guide between said opening and said energy-extracting means is varied, causing variation in the attenuation of said energy.

8. Apparatus for variable attenuation of electromagnetic energy comprising a section of coaxial line through which said energy is adapted to be conducted, a wave guide of cross-sectional dimensions below cut-off, said wave guide communicating with said coaxial line and having an end protruding through the outer conductor of said coaxial line but spaced from the inner conductor of said coaxial line, means for coupling said coaxial line to said wave guide, said means comprising a thin conductive member mounted across the inwardly protruding end of said wave guide, said thin conductive member having an opening therein, means for preventing energy reflections in said coaxial line due to the protrusion of the end of said wave guide into the outer conductor of said coaxial line, said means comprising tapered conductive members leading from the inner wall of the outer conductor of said coaxial line to the peripheral portion of said thin conductive member, means for extracting said energy from within said wave guide, and means for varying the position of said energy-extracting means causing variation in the attenuation of said energy.

9. Ultra-high-frequency apparatus for coupling a coaxial line and a wave guide communicating with said coaxial line and having an end protruding through the outer conductor of said coaxial line but spaced from the inner conductor of said coaxial line, said apparatus comprising a flat plate mounted across the inwardly protruding end of said wave guide, said flat plate having a rectangular slot therein extending perpendicularly to said coaxial line and means for preventing energy reflections in said coaxial line due to the inwardly protruding end of said wave guide, said means comprising tapered conductive members leading from the inner wall of said coaxial line to said flat plate.

10. Ultra-high-frequency apparatus for coupling a coaxial line and a wave guide communicating with said coaxial line and having an end protruding through the outer conductor of said coaxial line but spaced from the inner conductor of said coaxial line, said apparatus comprising a flat plate mounted across the inwardly protruding end of said wave guide, said flat plate having a slot therein, and means for preventing energy reflections in said coaxial line due to the inwardly protruding end of said wave guide, said means comprising tapered conductive members leading from the inner wall of said coaxial line to said flat plate.

11. Ultra-high-frequency apparatus for coupling a coaxial line and a wave guide communicating with said coaxial line and protruding through the outer conductor of said coaxial line, said apparatus comprising a flat plate mounted across the inwardly protruding end of said wave guide, said flat plate having an opening therein, and means for preventing energy reflections in said coaxial line due to the inwardly protruding end of said wave guide, said means comprising tapered conductive members leading from the inner wall of said coaxial line to said flat plate.

12. Ultra-high-frequency apparatus for coupling a coaxial line and a wave guide communicating with said coaxial line and protruding through the outer conductor of said coaxial line but spaced from the inner conductor of said coaxial line, said apparatus comprising a thin conductive member mounted across the inwardly protruding end of said wave guide, said member having an opening therein, and means for preventing energy reflections in said coaxial line due to the inwardly protruding end of said wave guide, said means comprising tapered conductive members leading from the inner wall of said coaxial line to said member.

13. Ultra-high-frequency apparatus for coupling a coaxial line and a wave guide communicating with said coaxial line and protruding through the outer conductor of said coaxial line but spaced from the inner conductor of said coaxial line, said apparatus comprising a thin conductive member mounted across the inwardly protruding end of said wave guide, said member having an opening therein, and means for preventing reflections in said coaxial line due to the inwardly protruding end of said wave guide, said means comprising tapered conductive members extending from the inner wall of the outer conductor of said coaxial line to the peripheral portion of said thin conductive member, thereby eliminating discontinuities in the line.

SAMUEL SENSIPER.

REFERENCES CITED

The following references are of record in the file of this patent:

UNITED STATES PATENTS

| Number | Name | Date |
|---|---|---|
| 2,088,749 | King | Aug. 3, 1937 |
| 2,106,713 | Bowen | Feb. 1, 1938 |
| 2,151,118 | King et al. | Mar. 21, 1939 |
| 2,197,123 | King | Apr. 16, 1940 |
| 2,199,045 | Dallenbach | Apr. 30, 1940 |
| 2,241,119 | Dallenbach | May 6, 1941 |
| 2,257,783 | Bowen | Oct. 7, 1941 |
| 2,408,032 | Beck | Sept. 24, 1946 |
| 2,411,553 | Ramo | Nov. 26, 1946 |
| 2,423,390 | Korman | July 1, 1947 |
| 2,423,396 | Linder | July 1, 1947 |